United States Patent
Sikveland et al.

(10) Patent No.: US 10,141,011 B2
(45) Date of Patent: Nov. 27, 2018

(54) CONVERSATION QUALITY ANALYSIS

(71) Applicant: Avaya Inc., Basking Ridge, NJ (US)

(72) Inventors: Rein Sikveland, Nottingham (GB); David Zeitlyn, Oxford (GB); Keith Ponting, Worcestershire (GB)

(73) Assignee: Avaya Inc., Basking Ridge, NJ (US)

( * ) Notice: Subject to any disclaimer, the term of this patent is extended or adjusted under 35 U.S.C. 154(b) by 1113 days.

(21) Appl. No.: 14/257,649

(22) Filed: Apr. 21, 2014

(65) Prior Publication Data

US 2015/0302868 A1 Oct. 22, 2015

(51) Int. Cl.
*G10L 25/78* (2013.01)
*G10L 25/51* (2013.01)
*G10L 17/00* (2013.01)

(52) U.S. Cl.
CPC .............. *G10L 25/78* (2013.01); *G10L 25/51* (2013.01); *G10L 17/00* (2013.01)

(58) Field of Classification Search
CPC .......... G10L 15/22; G10L 25/78; G10L 25/51
See application file for complete search history.

(56) References Cited

U.S. PATENT DOCUMENTS

| | | | | |
|---|---|---|---|---|
| 8,762,154 B1* | 6/2014 | Witt-ehsani | ........ | H04M 3/4936 379/88.01 |
| 8,843,372 B1* | 9/2014 | Isenberg | ................. | G10L 17/26 704/250 |
| 8,897,437 B1* | 11/2014 | Tan | ..................... | H04M 3/5175 379/265.02 |
| 2008/0040199 A1* | 2/2008 | Pinhanez | ........... | G06Q 10/0639 705/7.38 |
| 2008/0167952 A1* | 7/2008 | Blair | ..................... | G06Q 10/10 379/265.07 |
| 2010/0174533 A1* | 7/2010 | Pakhonnov | ............ | G10L 17/26 704/205 |
| 2011/0010173 A1* | 1/2011 | Scott | ................. | H04M 3/42221 704/235 |
| 2011/0040554 A1* | 2/2011 | Audhkhasi | ............ | G09B 19/04 704/9 |
| 2011/0164742 A1* | 7/2011 | Harma | .................... | H04M 3/56 379/219 |
| 2012/0265524 A1* | 10/2012 | McGowan | ......... | H04M 3/2236 704/211 |
| 2014/0067375 A1* | 3/2014 | Wooters | ................. | G06F 17/28 704/9 |

* cited by examiner

*Primary Examiner* — Brian L Albertalli

(57) ABSTRACT

Embodiments disclosed herein provide systems, methods, and computer readable media for analyzing a conversation between a plurality of participants. In a particular embodiment, a method provides determining a first speaker from the plurality of participants and determining a second speaker from the plurality of participants. The method further provides determining a first plurality of turns comprising portions of the conversation when the first speaker is speaking and determining a second plurality of turns comprising portions of the conversation when the second speaker is speaking. The method further provides determining a characterization for quality of the conversation based on gaps between turns of the first plurality of turns and turns of the second plurality of turns.

20 Claims, 6 Drawing Sheets

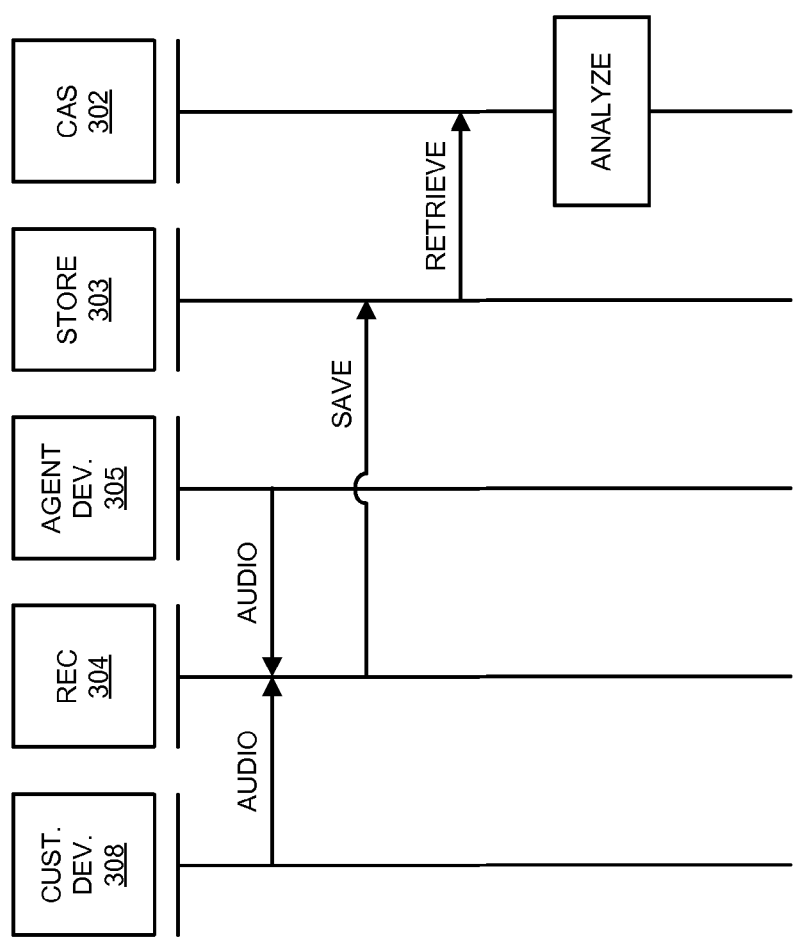

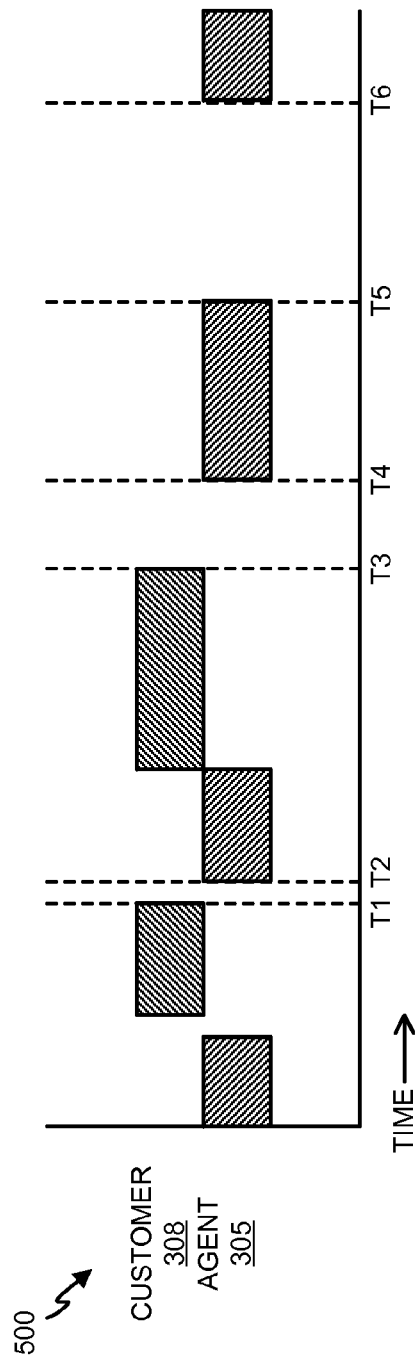
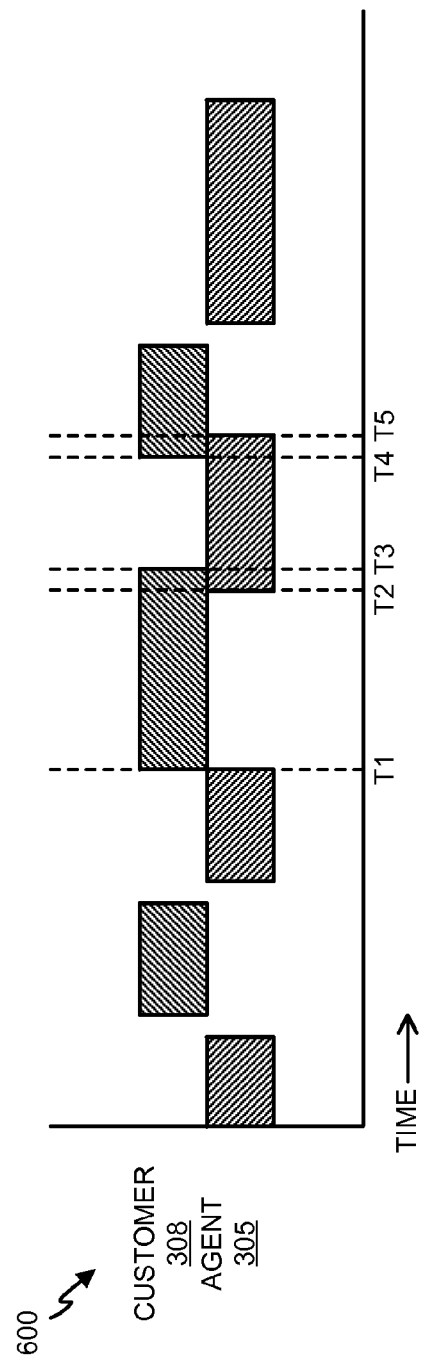

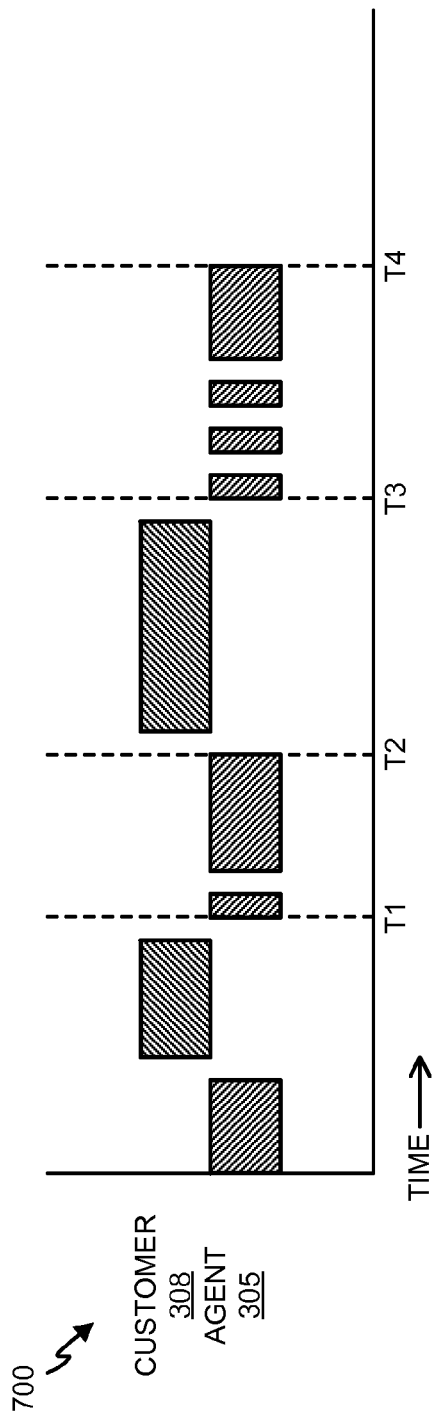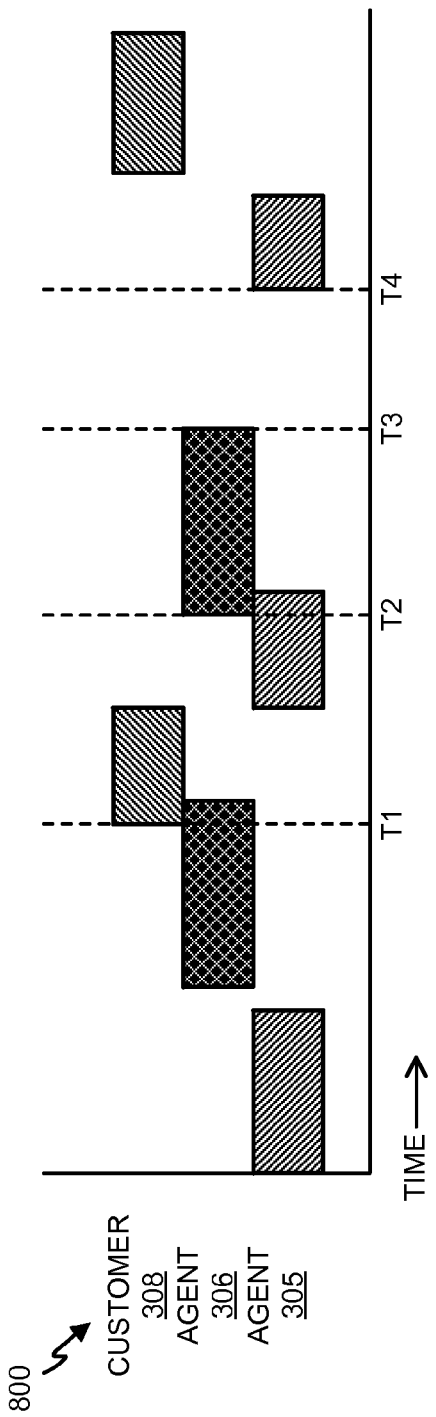

CONVERSATION QUALITY ANALYSIS

TECHNICAL BACKGROUND

A single call center can accept and/or make hundreds, if not thousands, of calls each day. Each accepted call results in at least one conversation between the customer and one or more call center agents. Information about these conversations may be desirable to an operator of the call center so that the operator can improve the services provided by the call center. Such information may be easily obtainable for a conversation by a human listening to the conversation. However, the number of conversations handled by the call center makes human analysis of every conversation unachievable.

While a speech recognition system may be able to recognize words spoken by the participants in a conversation, the words spoken are not necessarily indicative of the quality of the conversation as a social interaction. Moreover unconstrained speech recognition requires significant computational resource and, particularly if one participant speaks with an accent or the acoustic conditions are poor, the reliability of words generated from the speech recognition may be less than desirable. Accordingly, analysis of a conversation's quality may be better determined using means other than speech recognition.

Overview

Embodiments disclosed herein provide systems, methods, and computer readable media for analyzing a conversation between a plurality of participants. In a particular embodiment, a method provides determining a first speaker from the plurality of participants and determining a second speaker from the plurality of participants. The method further provides determining a first plurality of turns comprising portions of the conversation when the first speaker is speaking and determining a second plurality of turns comprising portions of the conversation when the second speaker is speaking. The method further provides determining a characterization for quality of the conversation based on gaps between turns of the first plurality of turns and turns of the second plurality of turns.

In some embodiments, determining the characterization comprises characterizing the quality as problematic when an amount of the gaps lasting a threshold period of time satisfies one or more criteria.

In some embodiments, the gaps include a plurality of turn incursions whereby turns of the first plurality of turns overlap turns of the second plurality of turns.

In some embodiments, determining the characterization comprises characterizing the quality as problematic when an amount of the plurality of turn incursions satisfies one or more criteria.

In some embodiments, determining the characterization is further based on a plurality of hesitations within turns of the first plurality of turns and the second plurality of turns.

In some embodiments, a hesitation of the plurality of hesitations comprises a gap within speech of a turn that is below a threshold amount of time that indicates when one turn ends and a second turn begins.

In some embodiments, determining the characterization comprises characterizing the quality as problematic when an amount of hesitations within the plurality of hesitations satisfies one or more criteria.

In some embodiments, the method further provides grouping the conversation with a plurality of conversations based on the characterization.

In some embodiments, the method further provides identifying common properties between each conversation of the plurality of conversations.

In another embodiment, a conversation analysis system for analyzing a conversation between a plurality of participants is provided. The system includes a storage system configured to store the conversation. The system further includes a processing system configured to determine a first speaker from the plurality of participants and determine a second speaker from the plurality of participants. The processing system is further configured to determine a first plurality of turns comprising portions of the conversation when the first speaker is speaking and determine a second plurality of turns comprising portions of the conversation when the second speaker is speaking. The processing system is further configured to determine a characterization for quality of the conversation based on gaps between turns of the first plurality of turns and turns of the second plurality of turns In yet another embodiment, a non-transitory computer readable medium is provided. The computer readable medium has instructions stored thereon for operating a conversation analysis system to analyze a conversation between a plurality of participants. The instructions, when executed by the conversation analysis system, direct the conversation analysis system to determine a first speaker from the plurality of participants and determine a second speaker from the plurality of participants. The instructions further direct the system to determine a first plurality of turns comprising portions of the conversation when the first speaker is speaking and determine a second plurality of turns comprising portions of the conversation when the second speaker is speaking. The instructions further direct the system to determine a characterization for quality of the conversation based on gaps between turns of the first plurality of turns and turns of the second plurality of turns.

BRIEF DESCRIPTION OF THE DRAWINGS

FIG. 4 illustrates a method of operating the call center environment for analyzing a conversation between a plurality of participants.

FIG. 5 illustrates a timeline of a conversation for analysis.
FIG. 6 illustrates a timeline of a conversation for analysis.
FIG. 7 illustrates a timeline of a conversation for analysis.
FIG. 8 illustrates a timeline of a conversation for analysis.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
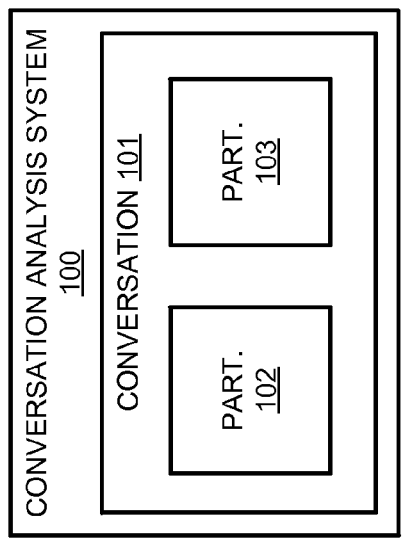
FIG. 1 illustrates a conversation analysis system for analyzing a conversation between a plurality of participants.

FIG. 1 illustrates conversation analysis system 100 that includes processing circuitry and a memory to store at least a portion of conversation 101. Conversation analysis system 100 processes conversation 101 between participant 102 and participant 103 to determine a characterization for quality of the conversation. Conversation 101 is a voice conversation and, therefore, includes audio information representing what was spoken by each of participants 102 and 103. The audio information may include a digital or analog representation of the each participants voice during conversation 101. The audio information may be generated by conversation analysis system 100 or may be received from another system that captured the conversation between participants 102 and 103. It should be understood that, while conversation 101 includes only two participants, there may be more than two participants in a particular conversation.

Figure 2:
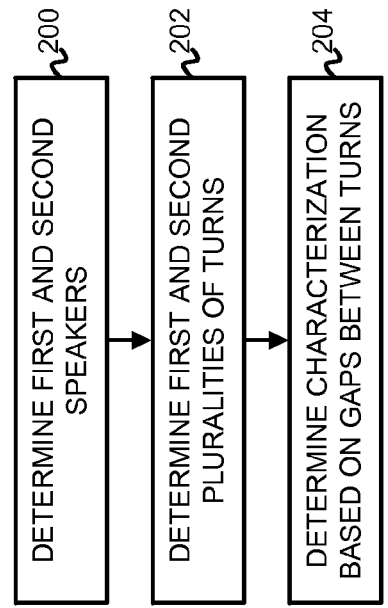
FIG. 2 illustrates a method for analyzing a conversation between a plurality of participants.

FIG. 2 illustrates method of analyzing a conversation between a plurality of participants. In particular, conversation analysis system 100 may use the method of FIG. 2 to analyze conversation 101. The method includes determining a first speaker from the plurality of participants (e.g. participants 102-103) and determining a second speaker from the plurality of participants (step 200). The method further provides determining a first plurality of turns comprising portions of the conversation when the first speaker is speaking and determining a second plurality of turns comprising portions of the conversation when the second speaker is speaking (step 202). The method then provides determining a characterization for quality of the conversation based on gaps between turns of the first plurality of turns and turns of the second plurality of turns (step 204).

In a particular example concerning conversation 101 from FIG. 1, at step 200, conversation analysis system 100 determines that participant 102 is one speaker in conversation 101 and participant 103 is another speaker in conversation 101. At step 202, conversation analysis system 100 determines a plurality of turns when participant 102 is speaking and a plurality of turns when participant 103 is speaking. At step 204, conversation analysis system 100 determines a characterization for quality of conversation 101 based on gaps between the turns of participant 102 and participant 103.

The characterization may be determined in real-time based on audio received by conversation analysis system 100 as the conversation proceeds or at a later time based on prerecorded audio information for the conversation. The conversation need not be completed before conversation analysis system 100 begins processing the prerecorded audio information for the conversation.

In various embodiments, any method of differentiating between speakers in a captured audio conversation may be used in the above method. In some examples, conversation 101 comprises mono audio signal and one or more diarization techniques may be used to differentiate between speakers in a conversation. In other examples, conversation 101 comprises a multichannel audio signal and one or more voice activity detection techniques may be used to differentiate between speakers in a conversation.

Typically, participants in a conversation will take turns allowing each other to speak. Thus, once the speakers have been differentiated, the conversation can be divided into turns when each of the speakers is speaking. One turn may be differentiated from another turn when one speaker starts and another speaker begins. Additionally, if one speaker stops speaking and another speaker does not speak before the one speaker starts speaking again, then those two periods of time when the one speaker is speaking may be considered separate turns. That is, if the amount of time between the two periods of speaking is great enough (e.g. greater than a threshold amount of time), then those two periods are considered separate turns rather then merely a single turn having a pause therein.

After identifying at least a portion of the turns or as the turns are being identified, gaps between the turns can be determined to characterize the conversation. Specifically, the gaps may include floor transfer times between turns of different speakers, such as the time between a turn of participant 102 ending and the subsequent turn of participant 103 beginning. It is possible for a floor transfer time to be negative, and the corresponding gap to thereby also be negative, if one participant begins speaking before another speaker finishes. In those situations, a negative floor transfer time may be considered a competitive turn incursion. A competitive turn incursion is identified based on at least one of the participants speaking louder and at a higher pitch than normal (e.g. above threshold loudness and pitch values). What is considered normal may be measured during other periods of the conversation (e.g. an average or median loudness/pitch) or may be measured against a predetermined baseline.

The identified gaps are then analyzed to characterize the conversation. The conversation may have a single overall characterization, multiple characterizations that correspond to multiple respective portions of the conversation, or both. In a particular example, a portion of the floor transfer time gaps may comprise semi-long gaps that are above one threshold length of time but below another threshold length of time (e.g. greater than 0.8 seconds but less than 2.5 seconds). If the proportion of semi-long gaps is large relative to other gaps (e.g. greater than a threshold percentage of total gaps in the conversation or portion of the conversation being analyzed), then the conversation, or the portion of the conversation being analyzed, may be characterized as problematic.

It should be understood that gaps with the same speaker speaking both before and after the gap are not floor transfers and are therefore not included in the statistics. In other embodiments, such "same speaker gaps" may also be included in the statistics or counted separately. The same or different thresholds may be used to characterize them as "semi-long" and the conversations as problematic.

It should be also understood that problematic as used herein is merely a generic term indicating that the quality of a conversation may have issues or may be otherwise less than desirable. More specific characterizations may also be determined. For example, rather than merely indicating a conversation quality as being problematic, a large number of semi-long gaps in the conversation may indicate that the interaction between the participants of the conversation is slower than expected or desired. The large amount of semi-long gap themselves may be indicative of extended issues with the participants understanding one another, as may occur when one or more of the participants is a non-native speaker of the language used for the conversation. Similarly, there may exist different levels of problematic. That is, there may be multiple thresholds that are able to characterize conversations as varying degrees of problematic. For example, a low, medium, and high threshold proportions of semi-long gaps may characterize conversations as being corresponding levels of problematic depending on which threshold is exceeded.

In some embodiments, characterizing the quality as problematic may flag the conversation for review by a user of the conversation analysis system. In some embodiments, the quality characterization for a particular conversation may be used to group the conversation with other similarly characterized conversations. Likewise, other factors may be used in such a grouping, such as who one or more of the participants were in the conversation, what time the conversation occurred, length of the conversation, subject matter of the conversation, or any other information about the conversation. Accordingly, correlations may be drawn between factors of a conversation and the characterization of the conversation quality for that conversation.

In some embodiments, the conversation quality may be, at least in part, further characterized by pauses within a turn of a participant. These intra-turn pauses may indicate hesitations, or stalls, within the conversation and are defined as three or more short speech segments (i.e. less than a threshold length of time) between short pauses (i.e. less than another threshold length of time). For example, a hesitation may be detected within a turn as being three speech segments each less than 0.6 seconds in length and having less than 0.5 seconds between each segment. Hesitations (e.g. "um," "uh," etc.) may be differentiated from backchannel speech (e.g. "yeah," "okay," etc.) based on pitch contour of the speech without having to identify the words that are being spoken. An amount of hesitations above a threshold proportion of hesitations within a conversation, or portion of the conversation, causes the conversation, or the portion, to be characterized as problematic. Moreover, as discussed above, a more specific characterization may be used. For example, if a conversation has too many semi-long gaps and too many hesitations, then the conversation quality may be characterized as both having understanding issues and hesitation issues.

Advantageously, the embodiments discussed above allow for a conversation to be characterized without the need for speech recognition. Specifically, analyzing the gaps between turns allows for characterization of the conversation's quality based on relative timing of speech from the participants in the conversation (i.e. based on the conversation's flow) rather than what words are actually spoken by the participants.

Figure 3:
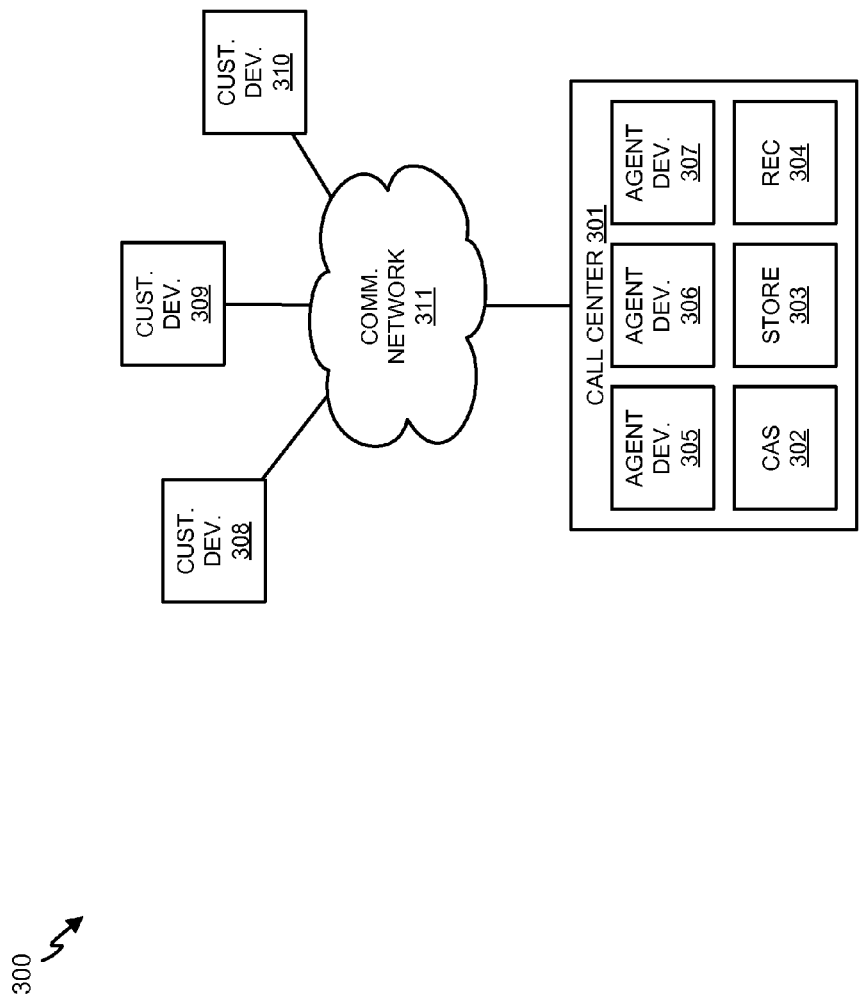
FIG. 3 illustrates a call center environment for analyzing a conversation between a plurality of participants.

FIG. 3 illustrates call center environment 300. Call center environment 300 includes call center 301, which includes conversation analysis system 302, conversation store 303, conversation recorder 304, and agent devices 305-307. Call center environment 300 further includes customer devices 308-310 and communication network 311. The elements 302-307 of call center 301 may be collocated at a common facility or may be distributed across multiple locations in communication over communication network 311 or otherwise. Call center 301 may also include additional systems and devices, such as a call distributor system, that are not shown for clarity.

Agent devices 305-307 and customer devices 308-310 each comprise communication circuitry for exchanging communications over communication network 311. Each of devices 305-310 may also include a user interface, memory device, software, processing circuitry, or some other communication components. Each of devices 305-310 may be a telephone, computer, e-book, mobile Internet appliance, wired network interface card, wireless network interface card, media player, game console, or some other communication apparatus—including combinations thereof.

Conversation analysis system 302 comprises a computer system and communication interface. Conversation analysis system 302 may also include other components such as a user interface, router, server, data storage system, and power supply. Conversation analysis system 302 may reside in a single device or may be distributed across multiple devices. Conversation analysis system 302 is shown externally to conversation store 303 and conversation recorder 304, however, conversation analysis system 302 may be incorporated with one or more of these other systems.

Conversation recorder 304 comprises a computer system and communication interface. Conversation recorder 304 may also include other components such as a user interface, router, server, data storage system, and power supply. Conversation recorder 304 may reside in a single device or may be distributed across multiple devices. Conversation recorder 304 is shown externally to conversation store 303 and conversation analysis system 302, however, conversation recorder 304 may be incorporated with one or more of these other systems.

Conversation store 303 comprises a communication interface and a data storage system. The data storage system may include one or more hard disk drives, flash memory, magnetic tape drives, or any other type of non-transitory storage media. Conversation store 303 may reside in a single device or may be distributed across multiple devices. Conversation store 303 is shown externally to conversation recorder 304 and conversation analysis system 302, however, conversation store 303 may be incorporated with one or more of these other systems.

Communication network 311 comprises network elements that provide communications services to customer devices 308-310 and call center 301. Communication network 311 may comprise switches, wireless access nodes, Internet routers, network gateways, application servers, computer systems, communication links, or some other type of communication equipment—including combinations thereof. Communication network 311 could use various communication protocols, such as Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof.

FIG. 4 is a sequence diagram illustrating an operation of call center environment 300 to analyze a conversation between a plurality of participants. In operation, a customer operates customer device 308 to place a call in order to speak with an agent at call center 301. The customer may want to make a purchase, ask a question, or any other reason for a customer/agent interaction. In this example, the call from customer device 308 is routed to agent device 305 and a conversation between the customer and an agent operating agent device 305 commences. In alternative examples, it should be understood that the call may instead be initiated by agent using device 305, or by the call centre 301, which connects agent device 305 (if the agent operating that device is available) to customer device 308 when the customer answers the call.

During the conversation, conversation recorder 304 receives audio captured by customer device 308 for the customer's side of the conversation. Similarly, conversation recorder 304 also receives audio captured by agent device 305 for the agent's side of the conversation. The audio may be received as analog or digital audio information representing the audible elements (e.g. voices) of the conversation. The audio may be received in real time during the conversation or may be received at some other time, such as recorded by agent device 305 and transferred to conversation recorder 304 after the conversation ends. Conversation recorder 304 may be an intermediate system in the communication path between customer device 308 and agent device 305 in order to receive the audio information for both sides of the conversation. Alternatively, conversation recorder 304 may receive audio information from another system or device, including audio information directly from one or more of devices 308 and 305. The audio information may be received for the conversation as a whole or may be received individually for the conversation participants (i.e. the customer and the agent).

Regardless of how the audio information is received, conversation recorder 304 saves the audio information in conversation store 303 so that the audio information for the conversation can be accessed by conversation analysis system 302. Along with the audio information, conversation recorder 304 may also store metadata for the conversation, such as identities of one or more of the conversation participants, general subject matter of the conversation (e.g. tech support, sales, etc.), more specific subject matter (e.g. a particular support issue, a particular product for sale, etc.), time the conversation occurred, or any other information that may be known about a conversation.

After the conversation is stored, conversation analysis system 302 retrieves the audio information from conversation store 303 and analyses the conversation audio to characterize the conversation as described herein. Specifically, conversation analysis system 302 identifies the customer operating customer device 308 as a first speaker on the conversation and the agent operating agent device 305 as a second speaker on the conversation. Conversation analysis system 302 may not know the specific identities of the two speakers during the aforementioned step, but at least is able to identify two distinct speakers from the conversation audio. The call center 301 may also record in conversation store 303 information identifying the addition of further parties or audio sources to any particular call and such information may be used by conversation analysis system 302 to assist in determining the number of distinct speakers and determining and assigning speaker turns.

Either after identifying the speakers or concurrently with identifying the speakers, conversation analysis system 302 determines turns wherein each of the speakers is speaking. From the turns, conversation analysis system 302 can determine a characterization for the conversation based on the timing of gaps between turns and/or pauses (e.g. hesitations) within the turns. If the conversation has high proportions (i.e. above threshold proportions) of semi-long gaps and/or hesitations, then the conversation is characterized as problematic. If not, then the conversation is characterized as normal or otherwise not problematic.

The characterization for a conversation, or multiple characterizations for multiple portions of the conversation, is then stored in a memory for conversation analysis system 302. Alternatively, the characterization(s) may be stored in conversation store 303 as part of the metadata for the conversation or otherwise associated with the conversation. The characterization(s) may be stored along with other characterizations determined for other conversations so that the characterizations for the conversations can be further analyzed. This further analysis may be performed by conversation analysis system, by some other computer system with access to the characterization data, or presented to a human operator for analysis. An example of such analysis may include determining common factors between conversations having similar characterizations, such as one or more common participants, common subject matter, common durations, or other features that a conversation may have.

The threshold proportions of semi-long gaps and hesitations used by conversation analysis system 302 may be predetermined by entrance of the thresholds by a user of conversation analysis system 302, by downloading the thresholds into system 302 or by loading the thresholds into 302 by some other means. In other embodiments, conversation analysis system 302 may be capable of learning the thresholds using training conversations. For example, conversation analysis system 302 may be provided with conversations that are pre-characterized as problematic and conversations that are pre-characterized as non-problematic. Conversation analysis system 302 then analyses the conversations to determine thresholds that would separate the problematic conversations from the non-problematic conversations. Those thresholds are then used to characterize other conversations that have not been pre-characterized.

FIG. 5 illustrates a timeline 500 of a conversation for analysis. In particular, timeline 500 represents an example of at least a portion of the conversation discussed above with respect to FIG. 4. Thus, the upper bars of timeline 500 correspond to turns when the customer operating customer device 308 is speaking and the lower bars of timeline 500 correspond to turns when the agent operating agent device 305 is speaking. In this example, conversation analysis system 302 determines that the gap between when the customer stops speaking at time T1 and the agent starts speaking at time T2 is shorter than a lower threshold amount of time for being considered a semi-long gap. Therefore, the gap between times T1 and T2 is not considered a semi-long gap when conversation analysis system 302 determines a characterization for the conversation.

Alternatively, the gap between T3 and T4 is longer than the lower threshold and shorter than an upper threshold amount of time for being considered a semi-long gap. Therefore, the gap between T3 and T4 is considered a semi-long gap when conversation analysis system 302 determines a characterization for the conversation. Additionally, the gap between T5 and T6 is longer than a threshold amount of time for considering the agent's speech after T6 to be a separate turn from the speech that ended at T5. Moreover, if "same-speaker" gaps are being considered, the gap between T5 and T6 is longer than the upper threshold for being a semi-long gap and thereby would not be considered a semi-long gap when determining the characterization for the conversation.

FIG. 6 illustrates a timeline 600 of a conversation for analysis. In particular, timeline 600 also represents an example of at least a portion of the conversation discussed above with respect to FIG. 4. Thus, the upper bars of timeline 600 correspond to turns when the customer operating customer device 308 is speaking and the lower bars of timeline 600 correspond to turns when the agent operating agent device 305 is speaking. In this example, conversation analysis system 302 determines that at time T1 the customer begins speaking immediately after the agent finishes, which corresponds to a gap having no duration. A gap of no duration falls below the threshold level for being a semi-long gap.

Additionally, conversation analysis system 302 determines that both the customer and the agent are speaking between times T2 and T3 and between times T4 and T5. In particular, at T2 the agent begins speaking while the customer is still speaking and the customer does not finish speaking for that turn until T3. Similarly, at T4 the customer begins speaking again while the agent is still speaking and the agent does not finish speaking for that turn until T5. These two periods of time create gaps having negative durations. Gaps with negative durations may correspond to competitive turn incursions where one participant's turn overlaps the turn of another participant.

FIG. 7 illustrates a timeline 700 of a conversation for analysis. In particular, timeline 700 also represents an example of at least a portion of the conversation discussed above with respect to FIG. 4. Thus, the upper bars of timeline 700 correspond to turns when the customer operating customer device 308 is speaking and the lower bars of timeline 700 correspond to turns when the agent operating agent device 305 is speaking. In this example, conversation analysis system 302 determines that agent turns between times T1 and T2 and times T3 and T4 both include intra-turn pauses. Intra-turn pauses are gaps between speech by the same participant that are not longer than a threshold amount of time for the pauses to be considered gaps between turns by the same speaker. Moreover, as described above, hesitations are defined as three or more short speech segments (i.e. less than a threshold length of time) between short intra-turn pauses (i.e. less than another threshold length of time). Thus, conversation analysis system 302 determines that the turn between T1 and T2 does not include a hesitation while the turn between T3 and T4 does include a hesitation.

FIG. 8 illustrates a timeline 800 of a conversation for analysis. In particular, timeline 800 represents an example of at least a portion of the conversation discussed above with respect to FIG. 4 after another agent operating agent device 306 joins the conversation. Thus, the upper bars of timeline 700 correspond to turns when the customer operating customer device 308 is speaking, the middle bars of timeline 700 correspond to turns when the agent operating agent device 306 is speaking, and the lower bars of timeline 700 correspond to turns when the agent operating agent device 305 is speaking. In this example, consistent with the examples above having only two participants, conversation analysis system 302 determines that a competitive turn incursion occurs at time T1 between the customer and the agent of system 306. Likewise, conversation analysis system 302 determines that a competitive turn incursion occurs at time T2 between the agent of system 305 and the agent of system 306. Furthermore, conversation analysis system 302 determines that a semi-long gap occurs between times T3 and T4.

Figure 9:
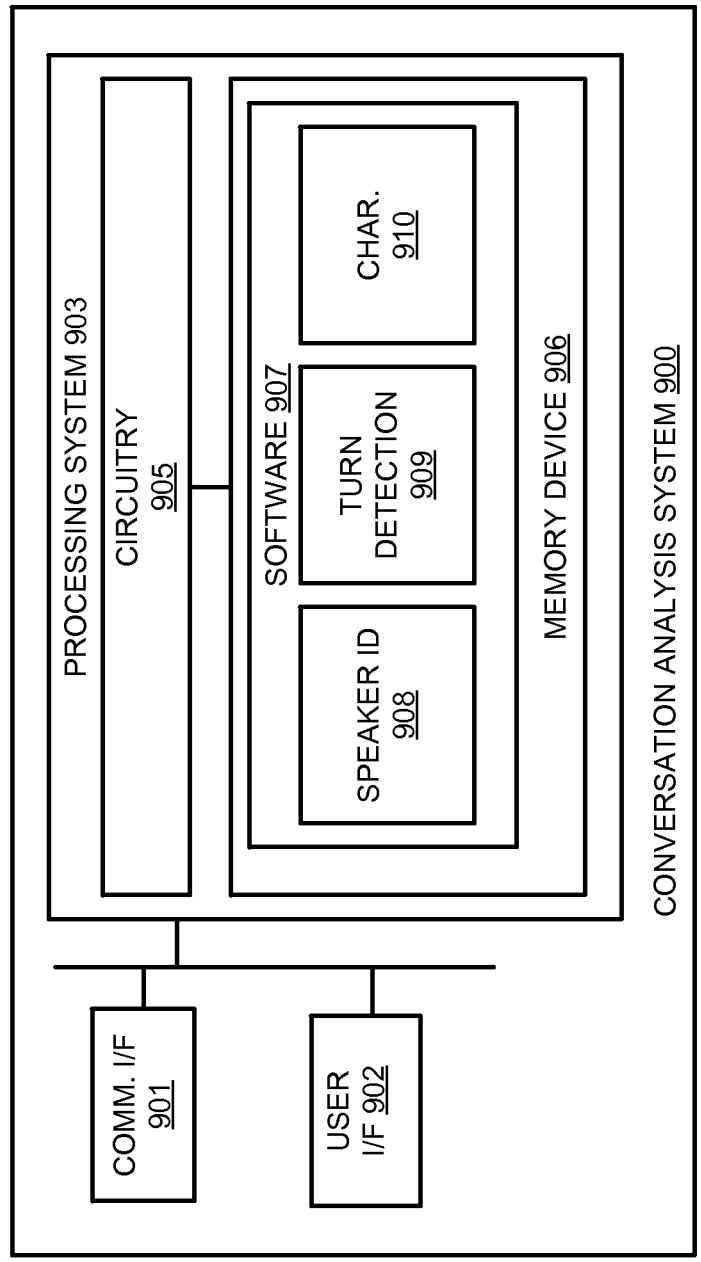
FIG. 9 illustrates a conversation analysis system for analyzing a conversation between a plurality of participants.

FIG. 9 illustrates conversation analysis system 900. Conversation analysis system 900 is an example of conversation analysis systems 100 and 302, although systems 100 and 302 may use alternative configurations. Conversation analysis system 900 comprises communication interface 901, user interface 902, and processing system 903. Processing system 903 is linked to communication interface 901 and user interface 902. Processing system 903 includes processing circuitry 905 and memory device 906 that stores operating software 907.

Communication interface 901 comprises components that communicate over communication links, such as network cards, ports, RF transceivers, processing circuitry and software, or some other communication devices. Communication interface 901 may be configured to communicate over metallic, wireless, or optical links. Communication interface 901 may be configured to use TDM, IP, Ethernet, optical networking, wireless protocols, communication signaling, or some other communication format—including combinations thereof.

User interface 902 comprises components that interact with a user. User interface 902 may include a keyboard, display screen, mouse, touch pad, or some other user input/output apparatus. User interface 902 may be omitted in some examples.

Processing circuitry 905 comprises microprocessor and other circuitry that retrieves and executes operating software 907 from memory device 906. Memory device 906 comprises a non-transitory storage medium, such as a disk drive, flash drive, data storage circuitry, or some other memory apparatus. Operating software 907 comprises computer programs, firmware, or some other form of machine-readable processing instructions. Operating software 907 includes speaker identification module 908, turn detection module 909, and quality characterization module 910. Operating software 907 may further include an operating system, utilities, drivers, network interfaces, applications, or some other type of software. When executed by circuitry 905, operating software 907 directs processing system 903 to operate conversation analysis system 900 as described herein.

In particular, speaker identification module 908 directs processing system 903 to determine a first speaker from the plurality of participants and determine a second speaker from the plurality of participants. Turn detection module 909 directs processing system 903 to determine a first plurality of turns comprising portions of the conversation when the first speaker is speaking and determine a second plurality of turns comprising portions of the conversation when the second speaker is speaking. Characterization module 910 directs processing system 903 to determine a characterization for a quality of the conversation based on gaps between turns of the first plurality of turns and turns of the second plurality of turns.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of analyzing a conversation between a plurality of participants, comprising:
  in a processing system coupled to a storage system that stores the conversation:
    determining a first speaker from the plurality of participants;
    determining a second speaker from the plurality of participants;
    determining a first plurality of turns comprising portions of the conversation when the first speaker is speaking;
    determining a second plurality of turns comprising portions of the conversation when the second speaker is speaking; and
    determining a characterization for quality of the conversation based on gaps between turns of the first plurality of turns and turns of the second plurality of turns and further based on a plurality of hesitations within turns of the first plurality of turns and the second plurality of turns, wherein each hesitation comprises one or more gaps within speech of a turn that is below a threshold amount of time that indicates when one turn ends and a second turn begins.

2. The method of claim 1, wherein determining the characterization comprises:
characterizing the quality as problematic when an amount of the gaps lasting a threshold period of time satisfies one or more criteria.

3. The method of claim 1, wherein the gaps include a plurality of competitive turn incursions whereby turns of the first plurality of turns overlap turns of the second plurality of turns.

4. The method of claim 3, wherein determining the characterization comprises:
characterizing the quality as problematic when an amount of the plurality of competitive turn incursions satisfies one or more criteria.

5. The method of claim 1, wherein each hesitation further comprises three or more speech segments below a second threshold amount of time that are separated by gaps of the one or more gaps.

6. The method of claim 5, wherein the three or more speech segments are differentiated from backchannel speech based on pitch contour of the three or more speech segments.

7. The method of claim 1, wherein determining the characterization comprises:
characterizing the quality as problematic when an amount of hesitations within the plurality of hesitations satisfies one or more criteria.

8. The method of claim 1, further comprising:
grouping the conversation with a plurality of conversations based on the characterization.

9. The method of claim 8, further comprising:
identifying common properties between each conversation of the plurality of conversations.

10. A conversation analysis system for analyzing a conversation between a plurality of participants, the system comprising:
a storage system configured to store the conversation; and
a processing system configured to determine a first speaker from the plurality of participants, determine a second speaker from the plurality of participants, determine a first plurality of turns comprising portions of the conversation when the first speaker is speaking, determine a second plurality of turns comprising portions of the conversation when the second speaker is speaking, and determine a characterization for quality of the conversation based on gaps between turns of the first plurality of turns and turns of the second plurality of turns and further based on a plurality of hesitations within turns of the first plurality of turns and the second plurality of turns, wherein each hesitation comprises one or more gaps within speech of a turn that is below a threshold amount of time that indicates when one turn ends and a second turn begins.

11. The system of claim 10, wherein the processing system configured to determine the characterization comprises:
the processing system configured to characterize the quality as problematic when an amount of the gaps lasting a threshold period of time satisfies one or more criteria.

12. The system of claim 10, wherein the gaps include a plurality of competitive turn incursions whereby turns of the first plurality of turns overlap turns of the second plurality of turns.

13. The system of claim 12, wherein the processing system configured to determine the characterization comprises:
the processing system configured to characterize the quality as problematic when an amount of the plurality of competitive turn incursions satisfies one or more criteria.

14. The system of claim 10, wherein each hesitation further comprises three or more speech segments below a second threshold amount of time that are separated by gaps of the one or more gaps.

15. The system of claim 14, wherein the three or more speech segments are differentiated from backchannel speech based on pitch contour of the three or more speech segments.

16. The system of claim 10, wherein the processing system configured to determine the characterization comprises:
the processing system configured to characterize the quality as problematic when an amount of hesitations within the plurality of hesitations satisfies one or more criteria.

17. The system of claim 10, further comprising:
the processing system configured to group the conversation with a plurality of conversations based on the characterization.

18. The system of claim 17, further comprising:
the processing system configured to identify common properties between each conversation of the plurality of conversations.

19. A non-transitory computer readable medium having instructions stored thereon for operating a conversation analysis system to analyze a conversation between a plurality of participants, the instructions, when executed by the conversation analysis system, direct the conversation analysis system to:
determine a first speaker from the plurality of participants;
determine a second speaker from the plurality of participants;
determine a first plurality of turns comprising portions of the conversation when the first speaker is speaking;
determine a second plurality of turns comprising portions of the conversation when the second speaker is speaking; and
determine a characterization for quality of the conversation based on gaps between turns of the first plurality of turns and turns of the second plurality of turns and further based on a plurality of hesitations within turns of the first plurality of turns and the second plurality of turns, wherein each hesitation comprises one or more gaps within speech of a turn that is below a threshold amount of time that indicates when one turn ends and a second turn begins.

20. The non-transitory medium of claim 19, wherein to direct the conversation analysis system to determine the characterization, the instructions direct the conversation analysis system to:
characterize the quality as problematic when an amount of the gaps lasting a threshold period of time satisfies one or more criteria.

* * * * *